Nov. 11, 1969   R. N. SHERWIN   3,477,782
INFORMATION DISPLAY APPARATUS
Filed Feb. 21, 1967   8 Sheets-Sheet 1

INVENTOR.
RICHARD N. SHERWIN
BY Wells & St.John
ATTYS.

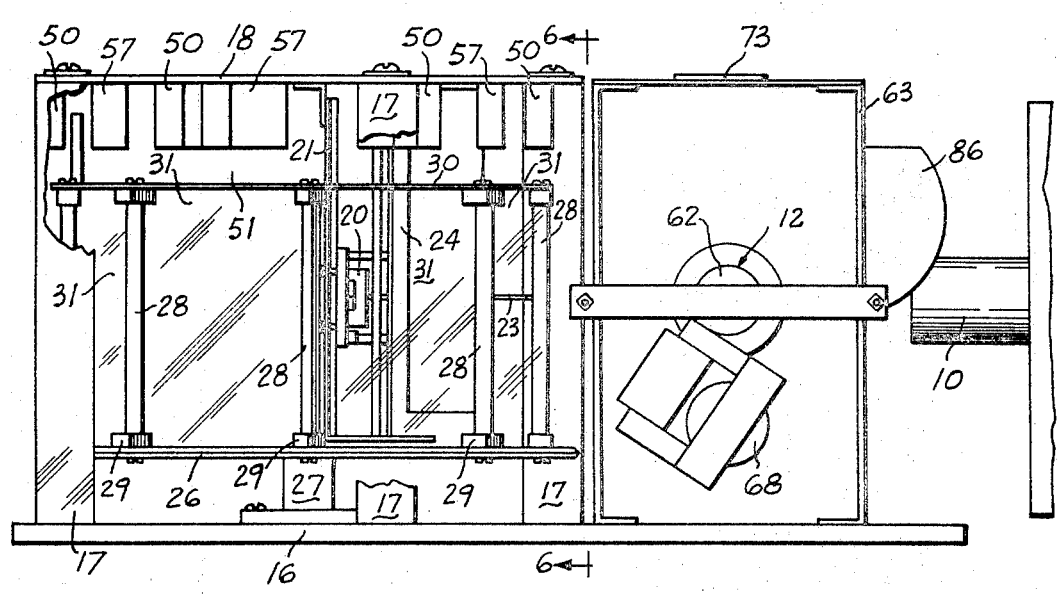
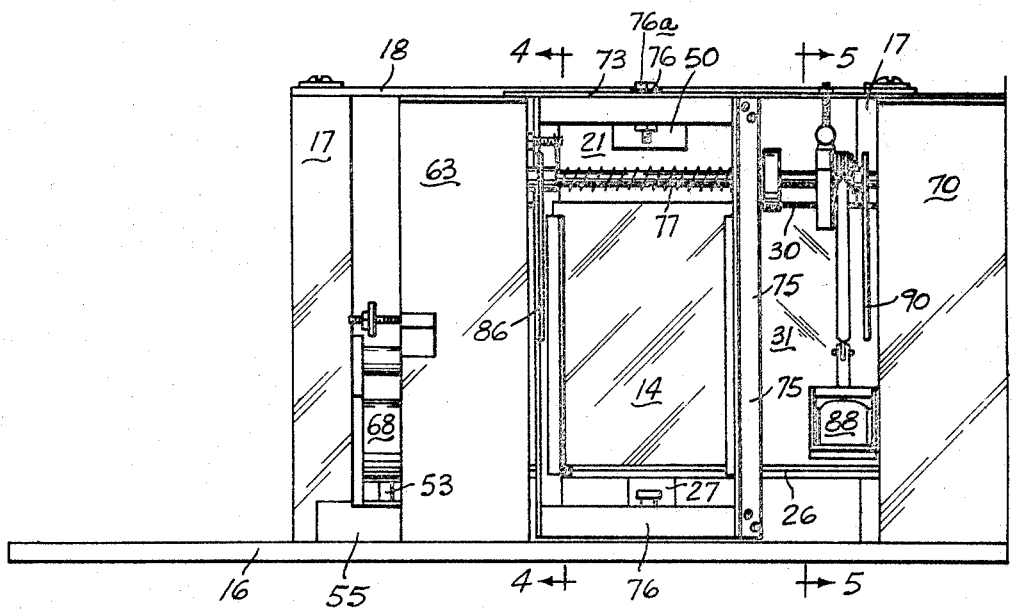

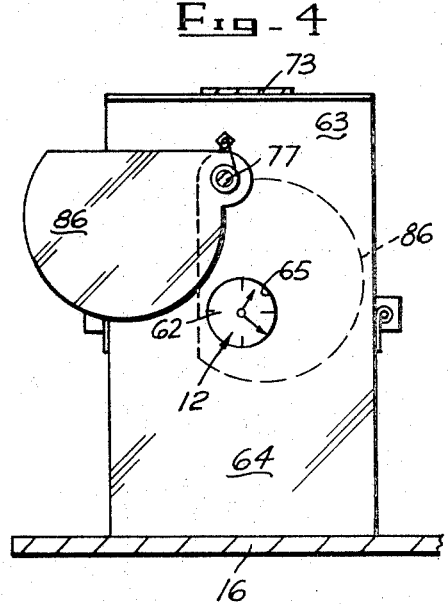
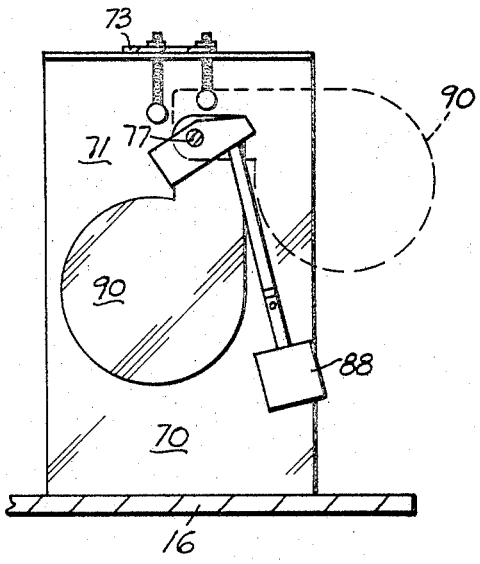
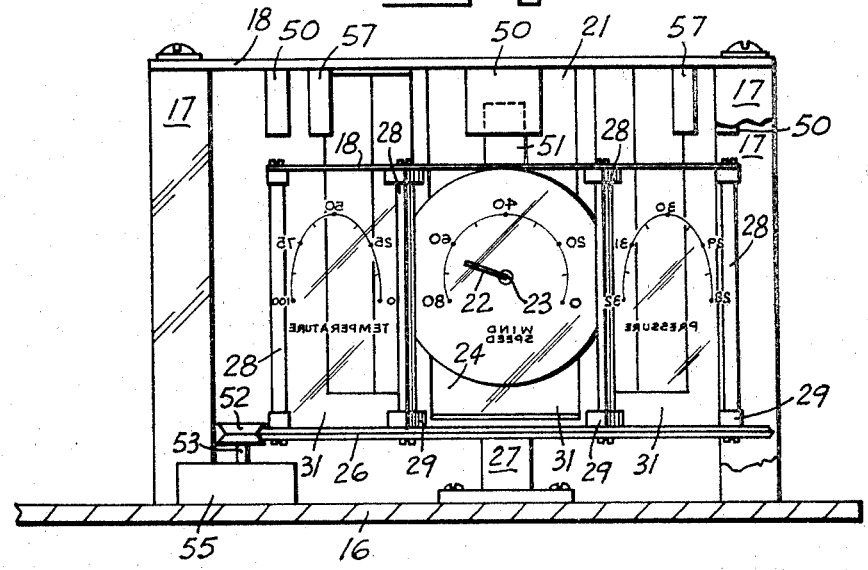

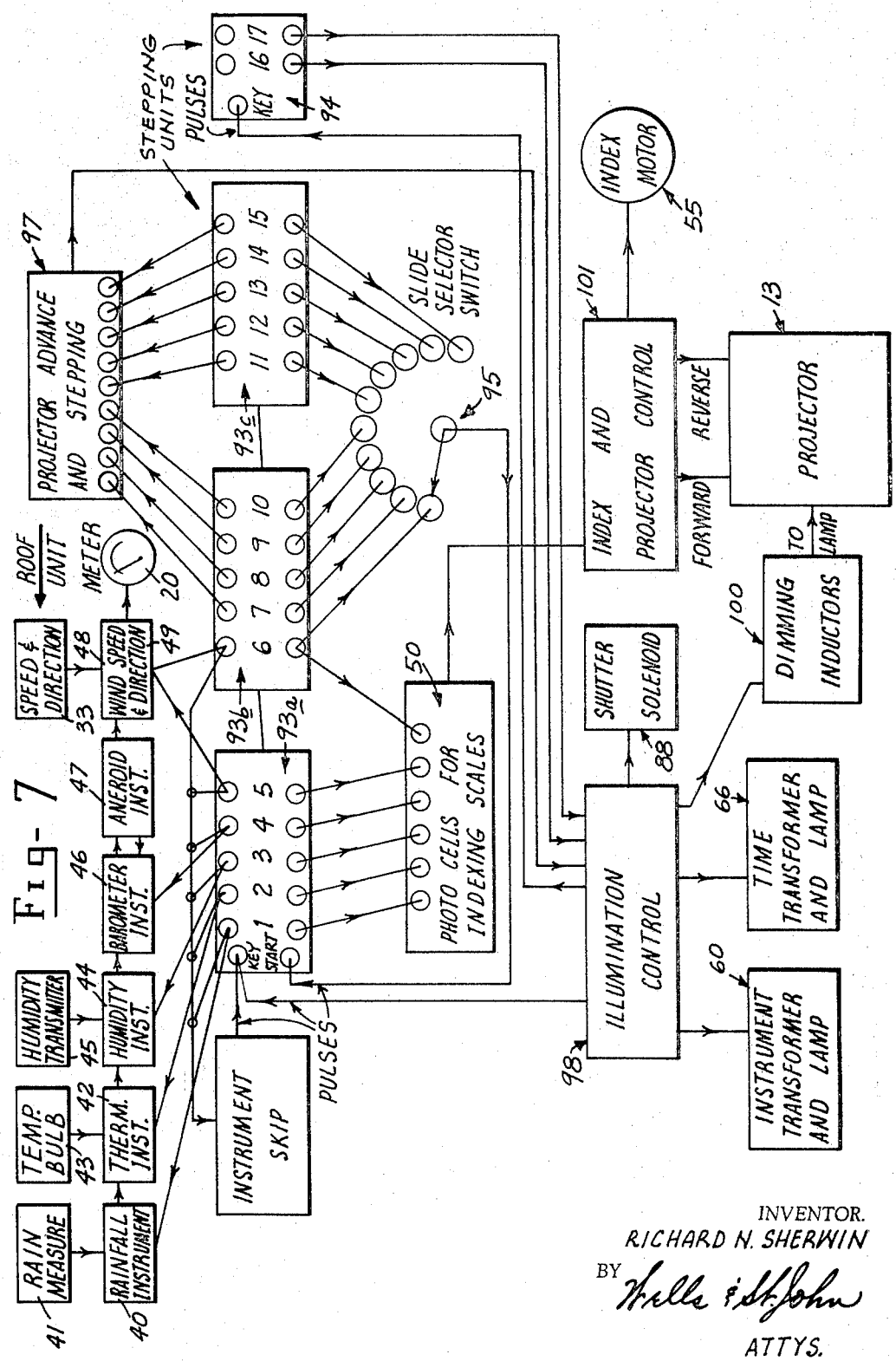

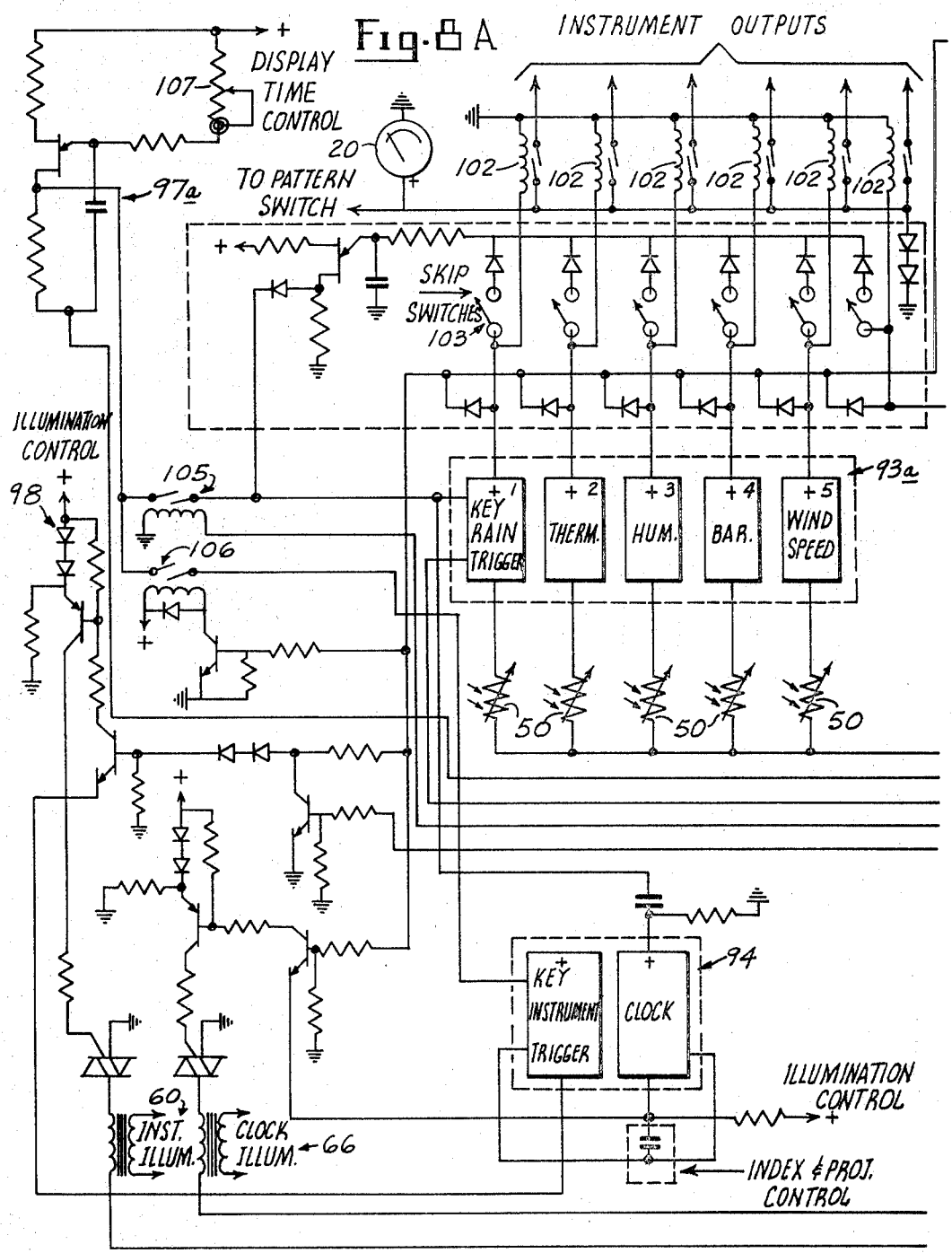

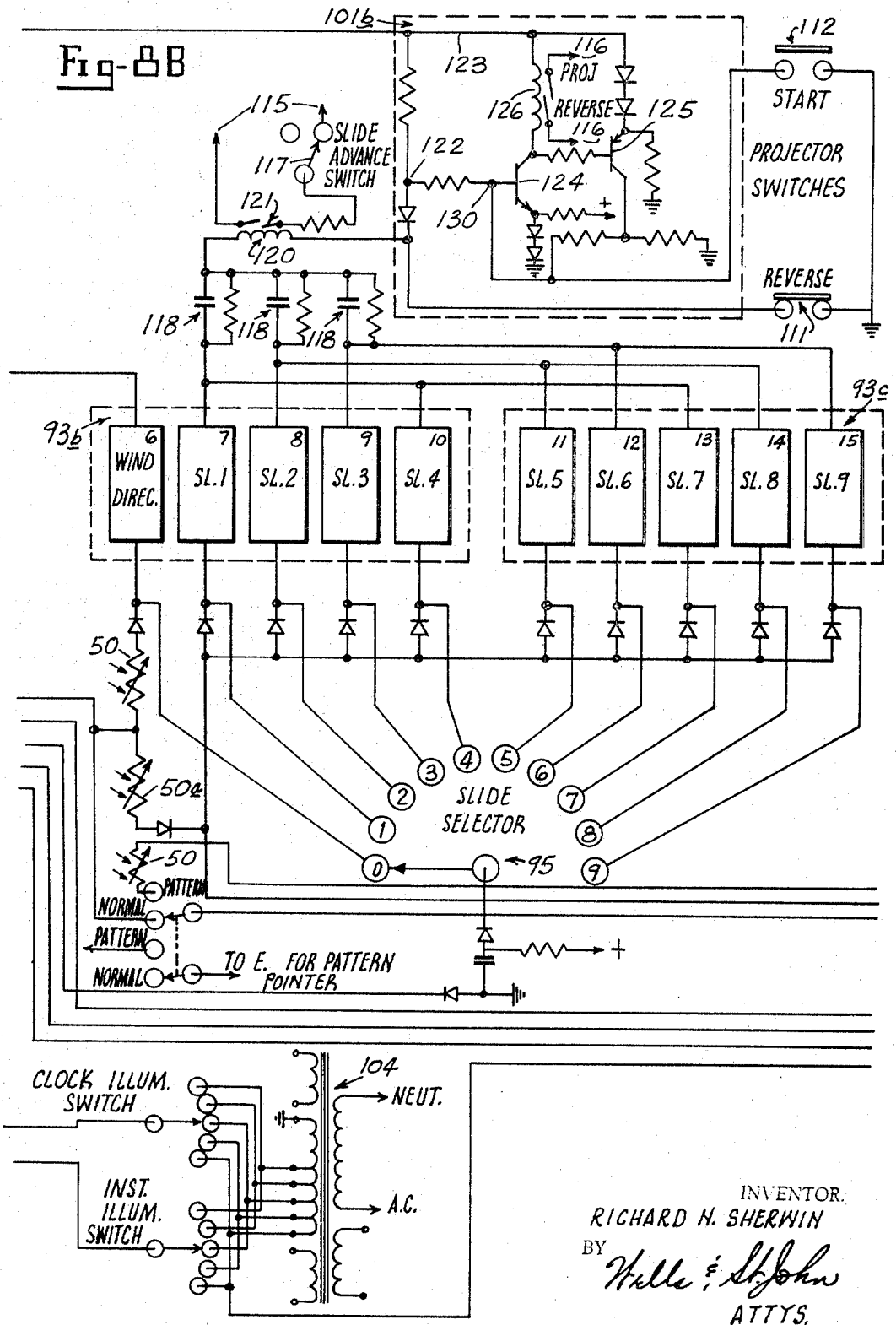

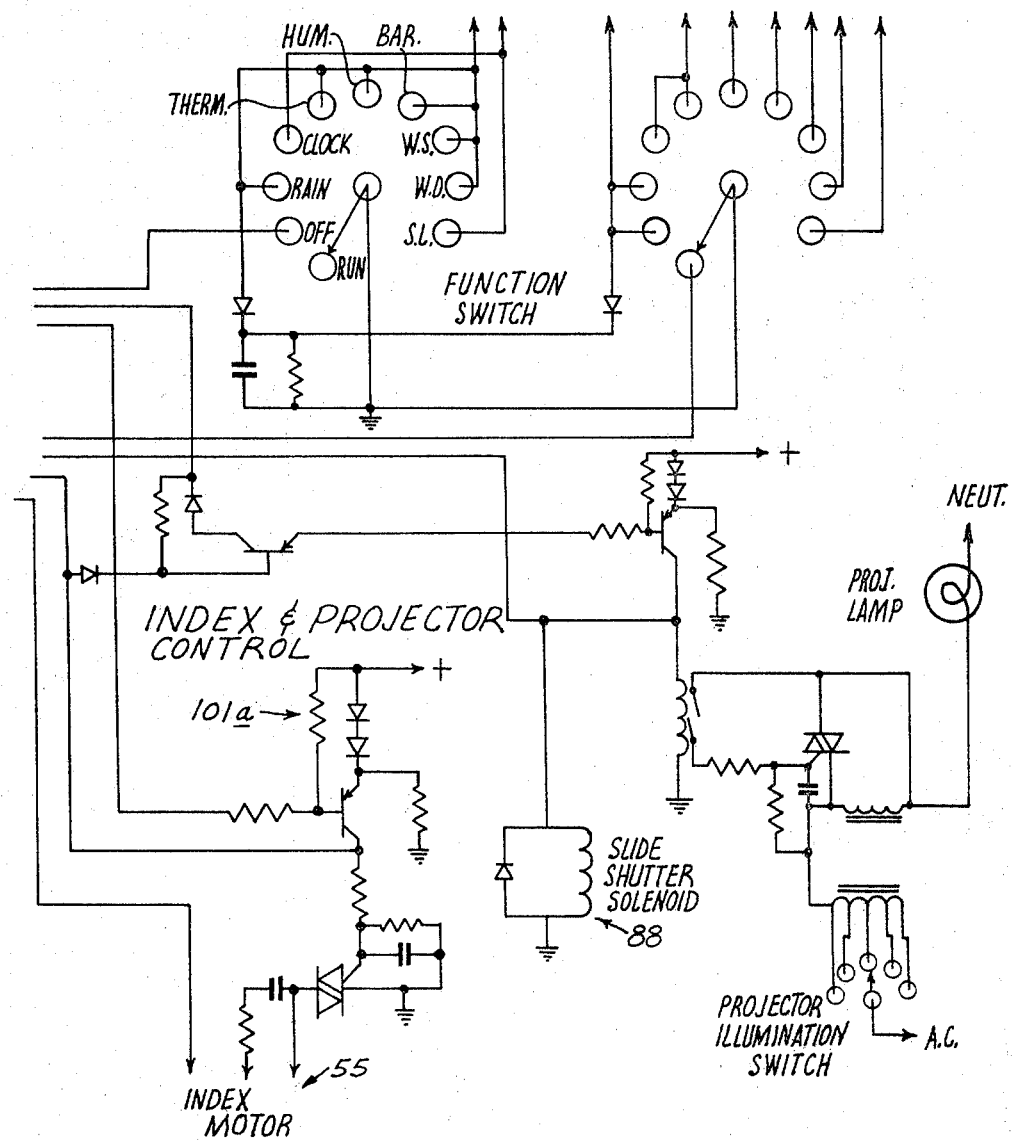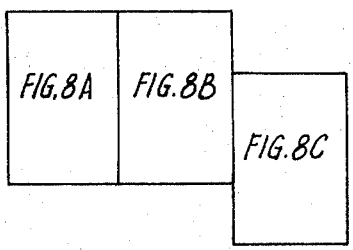

INVENTOR.
RICHARD N. SHERWIN
ATTYS.

United States Patent Office 3,477,782
Patented Nov. 11, 1969

3,477,782
INFORMATION DISPLAY APPARATUS
Richard N. Sherwin, Coeur d'Alene, Idaho, assignor to Electronic Systems Development, Inc., a corporation of Washington.
Filed Feb. 21, 1967, Ser. No. 617,574
Int. Cl. G03b 21/00, 21/26; G09f 13/00
U.S. Cl. 353—40
14 Claims

ABSTRACT OF THE DISCLOSURE

An information display apparatus for a television circuit having an indicator, transparent indicator faces which are moved one at a time in front of the indicator and input monitoring circuits. Also provided is a control for selectively connecting the input monitoring circuits one at a time to the indicator and for moving the indicator faces in front of the indicator. Information may be displayed via a television camera on a closed circuit television network or by broadcasting. The information display exhibits several types of information fed sequentially to a single meter. As each type of information is directed to the meter, a transparent indicator face relating to the information is interposed between the camera and the meter. For alternate display, a timepiece or slides from a conventional projector can be displayed to the camera by a mirror surface.

SUMMARY OF THE INVENTION

There is a need in the industry for a display apparatus that is capable of sequentially exhibiting various information by television for distribution in a closed circuit arrangement to a particular class of viewers or for distribution to the general public. In particular, there is a need for a display apparatus that is relatively inexpensive, reliable and efficient to continually and sequentially display time, weather conditions and announcement or advertisements.

Generally, in any particular geographical area there are spare channels that are unused by traditional, commercial and educational programming sources. This enables a hotel or other cable system to use a spare channel to provide continuous closed circuit programming as desired. Such a service is especially appreciated by traveling businessmen in a hotel, to enable them to be on time to their appointments and to be properly dressed for local weather.

Accordingly, one of the principal objects of my invention is to provide a new display apparatus that is capable of exhibiting sequentially a multitude of images to a television camera.

An additional object of my invention is to provide a new display apparatus that is efficient, versatile and reliable in operation, simple in construction and economical to manufacture.

A further object of my invention is to provide a device for automatically sequentially displaying the time, current weather conditions and other desired information to a television camera.

An additional object of my invention is to provide an apparatus that is capable of sequentially exhibiting images from several physical displays to a stationary television camera.

With these and other objects in mind, my invention contemplates an apparatus for sequentially exhibiting images from more than one physical display to a television camera wherein the appartus comprises a first physical display aligned with and opposing the camera, a second display aligned along an intersecting axis perpendicular to the camera axis, and a one-way mirror positioned at the intersection of the two axes for alternately reflecting the image of the second display to the camera and transmitting the image of the first display to the camera. A control system alternately illuminates the first and second display.

More particularly, the first physical display comprises a meter movement aligned with the camera, a number of transparent meter faces that are sequentially interposed in front of the meter movement, and a number of input monitoring circuits corresponding to the meter faces that are selectively connected to the meter movement.

Other objects and advantages of the invention will become apparent by reference to the following detailed description and the accompanying drawings illustrating a preferred embodiment thereof, in which:

DESCRIPTION OF THE DRAWINGS

FIG. 2 is a side elevation view of the apparatus as seen from the right in FIG. 1;

FIG. 3 is an elevation view of the apparatus as seen from the top in FIG. 1 with the camera not being illustrated;

FIG. 4 is a fragmentary sectional view looking toward the time display along the line 4—4 in FIG. 3;

FIG. 5 is a fragmentary sectional view looking toward the slide projector and taken along line 5—5 in FIG. 3;

FIG. 6 is an elevational section view taken along line 6—6 in FIG. 2; and

FIG. 7 is a diagrammatic view of the control devices and circuitry;

FIG. 8 is a somewhat schematic wiring diagram of the control circuitry, being compirsed of three sheets labeled as FIGS. 8A, 8B and 8C;

DESCRIPTION OF THE PREFERRED EMBODIMENT

Figure 9:
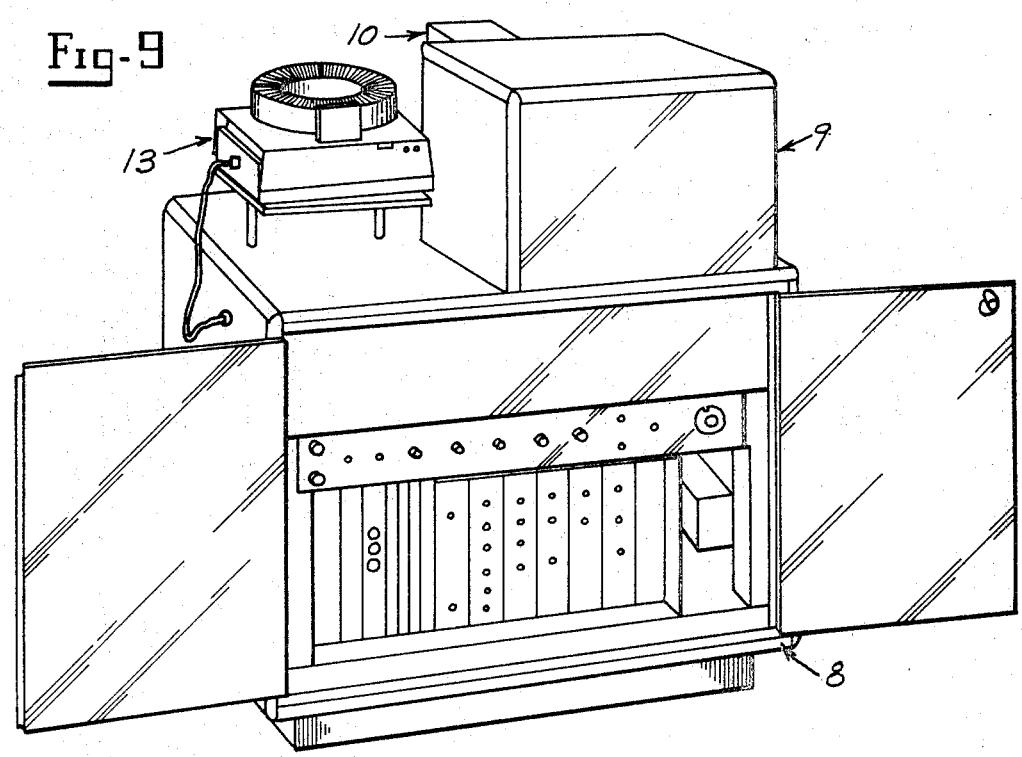
FIG. 9 is a perspective view of the physical apparatus.
Figure 11:
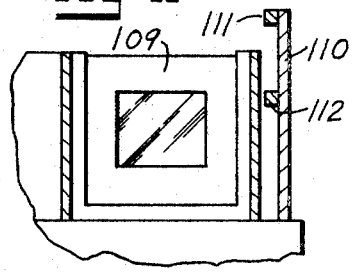
FIG. 11 is an enlarged fragmentary view taken along line 11—11 in FIG. 10.
Figure 10:
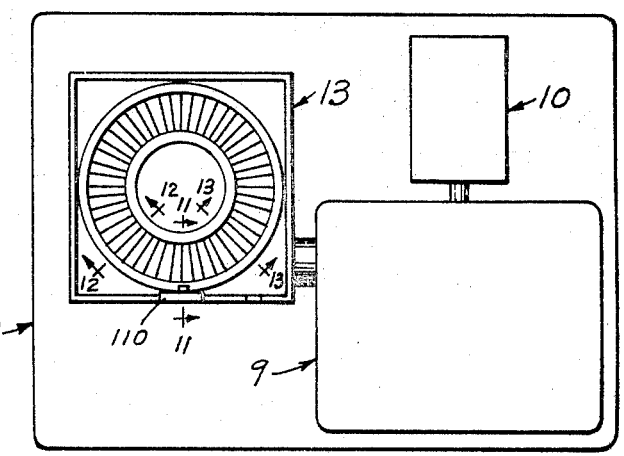
FIG. 10 is a top view of the apparatus in FIG. 9.
Figure 12:
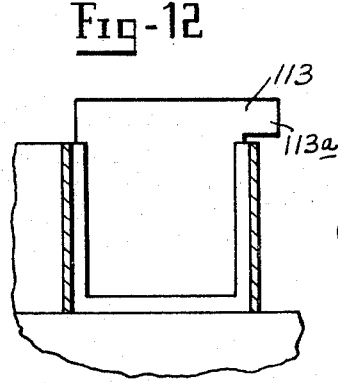
FIG. 12 is an enlarged fragmentary view taken along line 12—12 in FIG. 10.
Figure 13:
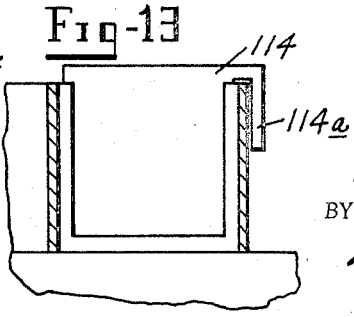
FIG. 13 is an enlarged fragmentary view taken along line 13—13 in FIG. 10.

This disclosure is concerned with a fully automated television display apparatus for projection of time, weather information, slides, and other pictorial information to a television camera. It can be used by commercial stations, by closed circuit networks and by community antenna and cable systems. The physical structure is most compact. As shown in FIG. 9, the controlling circuitry and manually operated controls are housed in a cabinet 8 (shown opened). The mechanical display devices are enclosed in a housing 9, with the associated projector 13 and camera 10 being also at the top of cabinet 8.

Figure 1:
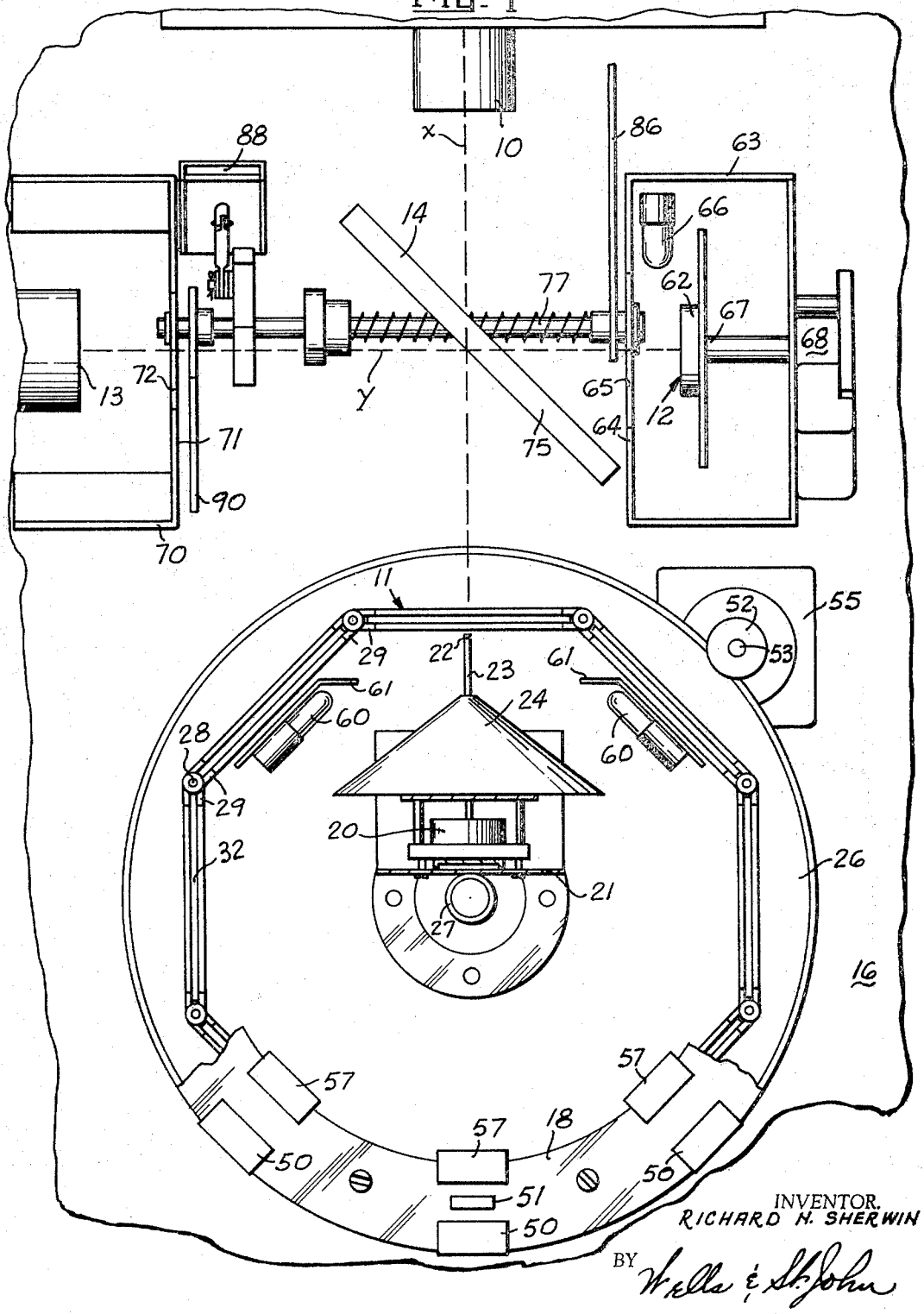
FIG. 1 is a plan view of a preferred embodiment of the invention taken from below the upper cover of the structure.

Referring now in particular to FIG. 1 of the drawings, the display apparatus within housing 9 is positioned in front of the television camera 10, having a viewing axis X. The display apparatus has a first changeable physical display 11 aligned along the axis X spaced from and opposing the camera 10. A second display 12 is aligned along an axis Y that is perpendiucular to the axis X. The automatic slide projector 13 is positioned along axis Y opposing and spaced from the second display 12. A one-way mirror 14 with a partial reflective surface along its plane area opposite to camera 10 is located at the intersection of the axes X and Y and is positioned at a 45° angle to said axes X and Y so that the image of the second display can be reflected to the camera 10 and the image of the first display 11 can be transmitted through the mirror 14 to the camera 10. The one-way mirror 14 further reflects the image from the projector 13 onto the first display 11.

Both of the displays 11 and 12 are mounted on a base plate 16 having vertical supports 17 extending therefrom to support a top plate 18, parallel to the base plate 16 (FIGS. 2–6).

The first display 11 comprises a visual indicator that is responsive to electrical signals fed thereto from a remote source for indicating a condition. Specifically, the indicator is a meter movement 20 that is supported and aligned along the X axis by a vertical support 21 suspended from plate 18. The meter movement 20 has a needle 22 that is transversely mounted to the axis X on a needle shaft 23. Needle 22 is colored or coated with a dark substance such as flat black paint that is relatively non-reflective. A conical member 24 is mounted coaxially about the needle shaft 23 and is coated with a light or white material to provide a light non-focusing background immediately behind the dark meter needle.

The first display 11 further comprises a conveying means for selectively and sequentially interposing transparent indicator faces in front of the indicator mechanism. As viewed by the camera 10, each time an indicator face is interposed in front of the indicator movement it appears as if a new indicator is positioned in the first display 11. Specifically, the conveying means comprises a turntable 26 that is rotatably mounted on a bearing support 27. Eight equiangular support posts 28 are vertically mounted to the turntable 26 near its periphery. A upper ring 30 is fixed to the support posts 28 to provide structural support.

The indicator faces are formed as seven plane transparent screens 31 that are supported between the upper ring 30 and the turntable 26 between the vertical support posts 28. The eighth screen is an opaque screen 32 which serves as a screen for the projector. The screens are mounted between the posts 28 by frames 29.

Numerals, figures and other indicia are placed on the transparent screens 31 to form individual indicator faces or frames. In the prefered embodiment, one of the transparent screens 31 has a common test pattern printed thereon to aid in the focusing of the television camera. The other five screens 31 have numerals or indicia placed thereon to form six separate meter faces that are associated with weather conditions, such as rainfall, temperature, humidity, barometric pressure, and wind speed and wind direction. As each of the transparent screens 31 is sequentially positioned in front of the meter movement 20, the image viewed by the television camera 10 indiciates a separate meter. For example, when the temperature meter face is positioned in front of the meter movement 20, the first display 11 appears to be a temperature meter.

The first display 11 also comprises a number of monitoring circuits that continually monitor an equal number of instruments that are sensitive to physical conditions. In the preferred embodiment, the monitoring circuits are connected to instruments (shown schematically in FIG. 7) for determining weather conditions. Monitoring circuit 40 is connected to an instrument 41 for measuring rainfall. Monitoring circuit 42 monitors a thermometer 43 for measuring temperature. Circuit 44 monitors a humidity instrument 45. Monitoring circuit 46 is connected to an aneroid instrument 47 that is responsive to the atmospheric pressure. Monitoring circuits 48 and 49 are connected to a wind speed and direction instrument 33. It should be appreciated that the monitoring circuits may be used to monitor various other responsive devices that are located remotely from a display unit.

The first display 11 further includes an indexing mechanism for sequentially rotating the turntable 26 to interpose the screens 31, 32 in front of the meter movement 20. The indexing mechanism includes a drive wheel 52 for engaging and rotating the turnable 26. The wheel 52 is supported by a motor shaft 53 of an indexing motor 55.

Any desired form of indexing device could be used to sequentially position turntable 26 about its bearing support axis. In the illustrated embodiment a series of stationary photocells 50 mounted on the lower side of plate 18, are located at equiangular positions about the turntable axis. Each is opposed by a light source 57. An upstanding flag 51 on the uper surface of ring 30 individually operates a selectively actuated photocell 50 as the turntable 26 and ring 30 reach each angular position.

The photocells 50 are wired in a control circuit for motor 55 which controls the timed sequential rotation imparted to shaft 53 and wheel 52, so that turntable 26 is stopped with one screen 31 or 32 perpendicular to axis X following each rotational cycle.

The lamps 60 are mounted adjacent the meter movement 20 for illuminating the needle 22 and the background 24. Reflector shields 61 are positioned in front of lamps 60 to reflect light onto the meter movement 20 and to prevent projection of light from the lamps 60 directly to the camera 10.

The second display 12 comprises an electrical time device 62 that is gyratably mounted in a housing 63 that substantially encolses the time device 62. The time device is typically a battery operated watch. The housing 63 comprises a front wall 64 that is positioned between the time device 62 and the mirror 14 transverse to the Y axis. The front wall 64 has an aperture 65 formed therein to permit the viewing of the time device by the camera. A light 66 is mounted adjacent the time device 62 for illuminating the face of the time device 62. The gyrating movement 67 is mounted to the housing 63 for gyrating the time device about the Y axis. A motor 68 is mounted to the housing 63 for driving the gyrating movement.

The time device 62 is gyrated so that each time an image from the second display is presented to the camera 10 the same device 62 will appear in a different location. This feature prevents a latent image of the time device from being formed on the television picture tube and interfering with subsequently projected images. If the time device 62 is stationary the continued repetitive projection of the time image would activate substantially the same phosphorous screen particles to cause the formation of a latent image of the time device on the television picture tube which would interferen with subsequently projected images.

A housing 70 for partly enclosing the projector lens is mounted to the base plate 16 opposing housing 63. The housing 70 includes a front wall 71 that is positioned between the projector and the mirror transverse to the Y axis. An aperture 72 is formed in the front wall 71 coaxially with the Y axis to permit the optical projection of a slide on the screen 32. A cross member or brace 73 extends between the housing 63, and the housing 74 above the Y axis.

The projector 13 may be of any common construction wherein the operation of the projector is fully automatic. Several commercial models of slide projectors available today might be used. The projector is set for automatic operation to project a single slide or a selected series of slides in timed relation to the sequential motion of turntable 26. The manner by which this display is controlled is described below.

The one-way mirror 14 is mounted in a rotatable frame 75 that is supported by bearings 76 mounted on the base plate 16 and the cross plate 73. The bearings 76 are aligned along a vertical axis for permitting the one-way mirror 14 to be pivoted about the vertical axis for precise angular alignment relative to the various optical elements. A locking screw 76a holds mirror 14 stationary during use.

During normal display of time and weather functions, the watch 62 and screens 31 are alternately illuminated by lamps 66, 60 respectively, these displays being otherwise in clear view of the camera lens. The lens of the slide projector must be covered, since it is impractical to turn the projector lamp off between slide cycles. When a slide is being projected, the watch 62 must be covered, since the mirror 14 will transmit light to it and would otherwise illuminate the watch dial. This sequence of covering and uncovering the projector lens and watch is controlled by a shutter mechanism best seen in FIGS. 1, 4 and 5.

A first shutter 86 is mounted on one end of a horizontal shaft 77, which is positioned above mirror 14 and which projects through the mirror frame. Shutter 86 is located immediately adjacent housing 63 for covering and uncovering the aperture 65. The shaft 77 which serves to move shutter 86 is pivoted by a linkage 87 actuated by a solenoid 88.

A second shutter 90 is mounted on the other end of shaft 77 immediately adjacent the projector housing 70 for covering and uncovering aperture 72. The shutters 86, 90 are each fixed to shaft 77 and are displaced 90° from one another about the axis of shaft 77 so that the aperture 65 is covered when the projector aperture 72 is uncovered, eliminating illumination of watch 62 by light from projector 14.

CONTROL MECHANISM

The control structure for the mechanism described above is shown schematicaly in FIG. 7 and illustrated in detail in FIG. 8. Referring first to FIG. 7, the operation of the display apparatus is timed in sequence by a logic control unit including three five-stage stepping units 93a, 93b and 93c which are selectively connected to form a ring counter circuit. The first six stages of the stepping circuits 93a and 93b are used respectively to control the six weather functions. The remaining nine stages of stepping circuits 93b and 93c are used to control the slide functions for display of any number of slides from one to nine. In addition, a two-stage stepping circuit 94 is used to alternately control the functions required for display of weather functions (or slide display) and time.

The six weather stages are connected to the six photocells 50 and the nine slide stages are connected to a manually positioned slide selector switch 95. The position of slide selector 95 determines the number of slides that will be displayed during a given slide display sequence. The weather instruments are shown (FIG. 7) connected respectively to the six weather function stages of the ring counter. The projector advance and stepping controls which operate the slide projector mechanism are generally designated in FIG. 7 by the numeral 97, this circuitry being connected to the nine stages of the stepping circuits 93b and 93c used for slide control.

The two stages of stepping circuit 94 are connected to an illumination control circuit 98 which controls the instrument lamps 60 and the time display lamp 66. The illumination control circuit 98 also controls a dimming inductor circuit 100 wired to the projector lamp in projector 13. The purpose of this circuitry is to dim the projector lamp during the portion of operating time in which no slide is being displayed, thereby lengthening the useful life of the projector lamp. The illumination control circuit 98 also controls the solenoid 88 for the movement of shutters 86, 90.

The photocells 50 control the index and projector control circuit 101, which in turn sequentially operates motor 55 to properly position the turntable and interlocks the operation of the forward and reverse movement of projector 13 for display of slides and resetting of the projector only during projection of time or weather functions.

The control apparatus is illustrated in greater detail in FIG. 8. The instrument controls for the weather functions are governed by the first six stages of the stepping circuits 93a and 93b. These stepping circuits activate the photocell 50 associated with the screen 31 containing the informational material for display of the particular weather instrument information. When one of the function stages is "on" a pulse activates the photoelectric cell 50 associated with the screen 31 and the index and projector control 101 will operate the motor 55 to turn the turntable 26 until zag 51 is interposed between the operating photocell 50 and its light source 57. At the same time, a pulse from the operating stage of the stepping circuit activates a relay 102 completing a circuit between the weather instrument and the meter movement 20. In this manner the information from the selected weather unit will angularly position the needle of meter movement 20 behind the proper screen 31 and the instrument will be ready for display of the weather function. During this preparation, the lamps 60 will be dark and the lamp 66 will be lighted so that the camera 10 will be viewing the time display 12.

In parallel with the connection between each weather instrument stage of the stepping circuits each relay 102 is a "skip switch" 103 which, when manualy closed, results in the stepping pulse being returned to the stepping circuit to immediately activate the next stage without display of the weather function. The purpose of the switches 103 is to eliminate display of a weather instrument during malfunction of the instrument and to permit repair or adjustment of an instrument without disrupting the operation of the remainder of the circuit.

The power for the apparatus is provided from an AC transformer shown at 104 in FIG. 8. This power supply furnishes the voltages required for the operation of the control functions. The weather instruments have their own built-in power supplies in conventional circuitry and do not depend on the power supply transformer 104 for power.

The index and projector control circuit 101 has two separate sections and functions better seen in FIG. 8. Section 101a (FIGURE 8C) performs the index function and operates the index motor 55, in conjunction with the indexing photocells 50 and light sources 50' operates to drive the turntable 26 to the proper angular location. The second section 101b (FIG. 8B) of the index and projector control circuit operates the forward and reverse circuits for the projector, as will be discussed below.

The illumination control circuit 98 contains the logic and control circuitry for the circuits powering lamps 60, 66 for the instruments and time display respectively, as well as the powering circuit for the shutter solenoid 88. The illumination circuits are supplied by a 120 volt winding on the main power transformer 104. The solenoid circuit for solenoid 88 is a low voltage DC circuit.

There also is a pulse steering circuit involving two relays 105, 106 in the illumination control circuit 98, which determine which one of the two outputs will handle a variable pulse produced by section 97a of the projector advance and stepping circuit, which includes a variable resistance 107 that controls the display of each function. The variably timed pulse advances the mechanism from function to function. At various times in the operating cycle, this pulse is fed to the first stage of the stepping circuit 94 or to its second stage.

A second section 97b of the projector advance and stepping circuit advances projector 13 one slide each time a cycled pulse is produced in the associated stages of stepping circuits 93b and 93c, the number of cycled pulses being governed by the setting of switch 95.

The ring counters are, as previously described, composed of four separate sections. The first three sections 93a, 93b and 93c determine which weather instrument is displayed and the number of slides displayed during each cycle. The two stages of the section 94 control the alternate functions of weather instruments (or slide) display and time display. Each time an alternation is completed, the multi-stage counter comprised of sections 93a, 93b and 93c is advanced one step.

The weather instruments may be conventional electronic weather sensing devices. The wind instrument 33 contains both the wind direction and wind speed instruments, and is connected to a direction transducer and speed head located in the outdoor unit. A self-contained unit including a dependent power supply has been used for this purpose. The thermometer unit 43 is preferably a resistance type instrument, with a sensing element located in the roof assembly. This instrument is also self-contained, with its own power supply. The humidity insrtument 45 measures humidity by means of the humidity transmitting unit located in the roof unit, and utilizes a self-contained bridge circuit. This instrument is also preferably self-contained. The barometer instrument 46 is similar to the humidity instrument except that the transmitter is designated an aneroid 47. The rainfall instrument 41 is preferably a pulsing circuit operated by pulses from a roof unit. It should measure rainfall in .01 inch increments and preferably send a pulse each .01 inch to the rainfall stepper unit shown in FIG. 7. The stepper unit then processes the pulses so that they are the same length, and a potentiometer is advanced in similar increments to provide the read-out in analog form. The rainfall instrument should also contain reset logic circuitry actuated each night at midnight or some other suitable time to reset the instrument to zero if there has been rainfall during the day.

The utilization of a slide projector in conjunction with the opaque screen 32 provides great flexibility in the chosen display. As shown in FIGS. 10-13, the projector used in the preferred embodiment is a commercially available projector such as those sold by the Eastman Kodak Company under the trademark "Carousel." The projector should be one provided with circuitry for advancing and reversing the direction of the slide tray. The projector illustrated utilizes a circular tray capable of holding more slides than will normally be used. Projector 13 is not physically modified except for the addition of a switch mounting plate 110 on the frame of the projector directly adjacent to the side edge of the rotatable tray. The plate 110 has two inwardly projecting switches 111 and 112 mounted on its inner surface (FIG. 11), the switches 111 and 112 being mounted one above the other. These switches 111 and 112 are actuated by cards 113 and 114 respectively, inserted in unused slots of the slide magazine. The cards 113 and 114 bound the slides 109 in the magazine which are to be displayed, card 113 being at the end of the display and card 114 being at the front. Card 114 is provided with an outwardly projecting tab 114a adapted to trip the switch 112. Card 113 is provided with an outwardly projecting tab 113a aligned so as to trip the switch 111.

Referring now to FIG. 8B, the projector is provided with two terminals 115 which control advance stepping of the slide magazine each time a pulse is directed to these terminals 115. The projector also has two terminals 116 which reverse the stepping procedure when a pulse is directed thereto. These terminals 115 and 116 are conventionally provided in the controls of the slide projector 113 utilized for this purpose. They are normally connected to a manual control on the frame of the projector 13 or to a remote control for manual operation of the projector.

To provide complete flexibility of slide choice, there is provided a slide advance switch 117 in series with one of the terminals 115. When the switch 117 is closed, the projector will be advanced one step each time a pulse is provided to the terminals 115. When the switch 117 is manually opened, the projector will continue to display a single slide.

The pulses to actuate the projector advance are obtained from the nine associated stages of the stepping circuits 93b and 93c. The slide selector switch 95 can be set to completely eliminate slide display or to show any number of slides from one to nine during each cycle of operation. If set to display a slide, the operating stage of the stepping circuits 93b and 93c will turn on the photocell 50a to properly index the carousel 26 so as to align the opaque screen 32 at the front of the instrument. The operating stage will also provide a pulse to charge one of three parallel condensers 118 which will then operate a relay 120 to close a normally open set of contacts 121. The closing of contacts 121 will then result in the projector being advanced one slide. The projector will continue to advance, in alteration with the time display, for as many slides as chosen at the switch 95. During such operation, the closed circuit provided by the normally closed finish switch 111 will maintain the point 122 (FIG. 8B) at ground potential. At the same time, the line 123 in the index and projection circuit 101b is connected to a bus that is positive in potential during slide and weather functions. The positive voltage at line 123 will turn on the transistors 124 and 125 to operate a relay 126 and close normally open contacts 127 to reverse the projector movement when switch 113 has been opened. Such reversal will continue until the start switch 112 closes to apply ground at point 130 and turn the transistors 124, 125 off. The projector therefore displays any desired number of slides and reverses itself to repeat the slide cycle when the last slide has been displayed. While the capability of the shown circuit is limiited to nine slides, obviously this can be increased by adding additional stepping stages. Furthermore, a greater number of slides can be in the magazine of the slide projector, and they will be shown in any chosen groups of up to nine or more slides each. This circuitry provides great flexibility and operating choice in the slide display.

If the last slide should be displayed prior to completion of the slide display cycle, the opening of finish switch 111 will not immediately reverse the projector, since this will also open the circuit to relay 120. The projector will not advance, but will repeat the display of the last slide until the selected number of slide displays has been finished. Then, the positive voltage at line 123 will operate transistors 124 and 125 during the display of the weather instruments. In this way, the slide display will never be reversed except during that time of a cycle in which the slides are not being utilized.

For test purposes, a conventional test pattern for the television circuitry can be printed on one of the screens 31. This pattern is manually selected for display by a switch 130, which actuates the selected indexing photocell 50b (FIG. 8B). This pattern, as well as the meter faces for weather functions, must be reversed so as to be compatible with the conventional dial of watch 62 when reflected by mirror 14. To convert the final image, the sweep circuitry in camera 10 must be reversed.

OPERATION

The normal cycle of operation in the apparatus illustrated is to portray, via the television camera, a first weather indicator, the present time, a second weather indicator, the present time again, the third weather indicator, the present time, and so on, with one or more slides interposed in this sequence in place of a weather indicator. In the apparatus illustrated there is only one opaque white screen 32, so that the sequence would involve the display of six successive weather indicators, and one to nine slides, with the time display. The practical sequence of these displays is provided by the sequential operation of the illuminating lights for the meter movement 20 and time device 62, along with the utilization of the shutters 86 and 90. This sequence of operation will now be described in detail, it being understood that the lights and operating solenoid are controlled in this sequence of operation by the electronic logic control unit 93.

As the turntable 26 is rotatably moved about its bearing support 27, the two lights 60 adjacent to the meter movement 20 remain off and the light 66 adjacent to the time device 62 is illuminated. In addition, the shutter 86 adjacent to the time device 62 is positioned so as to uncover the time device 62 along the axis Y, and shutter 90 is positioned so as to cover the aperture 72 and block the transmission of lights from the projector 13. At this time, the only illuminated area viewed by the camera lens will therefore be the illuminated face of the time device 62. At a fixed time interval, the illumination control circuit 98 will simultaneously turn off the light 66 and turn on the two lights 60 adjacent to the meter movement 20. The positions of shutters 86 and 90 remain unchanged, so that the only illuminated area perceived by the camera is now the face of meter movement 20, which is viewed through the proper transparent screen 31 having printed thereon the proper material relative to the information being indicated by the angular position of the needle 22. The display of the weather information is viewed by the camera along the axis X, through the one-way mirror surface while the time device 62 was viewed as a reflection. Again, following a fixed time interval, the logic control unit 93 will simultaneously deactivate the lights 60 and activate light 66, and again the turntable 26 will be rotated to properly index the succeeding screen 31 while the area about the meter movement is darkened so that movement of the screens 31 will not be detected by the continuously operating camera.

The control circuit is preset so as to activate solenoid 88 simultaneously with the positioning of opaque screen 32 in front of the meter movement 20. Activation of solenoid 88 causes the shaft 77 to be pivoted 90°, thereby covering aperture 65 to shield the time device 62 and uncover aperture 72 to permit projection of an image to the back side of mirror 14. The movement of shaft 77 thereby changes the display from the time display to the projected image on screen 32 presented by the pre-selected slide displayed by the projector 13. Again, following the pre-selected time interval, the logic control unit 93 will deactivate the solenoid 88 through the shutter control section 97 and illuminate the light 66 so that the time will be presented. The projector control unit 98 that controls the selection of slides on projector 13 can be preset to display several slides in a given order alternating each with a time display.

The structure shown is adaptable to a wide number of situations in which more or less weather functions are used and in which the slide controls might be eliminated altogether for economy. In place of slides, opaque cards can be used on the carousel 26 for direct reading to provide advertisements or information material to the viewer. Also, the carousel 26 can be positioned by other indexing devices, such as by a mechanical indexing arrangement or by the use of magnetically operated reel switches or by a combination of mechanical and electrical equipment. The details of this structure are not controlling, but the specific devices illustrated are shown only for purposes of example.

Having thus described my invention, I claim:
1. In a display apparatus for exhibiting information;
  (a) an indicator movement;
  (b) a plurality of transparent indicator faces;
  (c) conveying means for interposing the indicator faces one at a time in front of the indicator movement;
  (d) a plurality of input monitoring circiuts corresponding to the indicator faces; and
  (e) control means for selectively connecting the input monitoring circuits one at a time to the indicator movement and for activating the conveying means to interpose the corresponding indicator faces in front of the indicator movement.
2. In a display apparatus as defined in claim 1 wherein the indicator movement is aligned along a first axis opposing an image receiving unit and wherein:
  (f) a display is aligned along a second axis perpendicular and intersecting the first axis between the indicator movement and the image receiving unit;
  (g) a one-way mirror positioned at the intersection of the first and second axes for reflecting the image of the display to the image receiving unit and transmitting the image of the indicator movement and associated indicator face to the image receiving unit;
  (h) a first lighting means for illuminating the indicator movement;
  (i) a second lighting means for illuminating the display; and
  (j) control means for alternately activating the first and second lighting means.
3. In a display apparatus as defined in claim 2 wherein a shutter is positioned in front of the display and wherein the control means alternately activates the first lighting means and opens the shutter.
4. In a display apparatus as defined in claim 1 wherein the indicator movement is a meter movement and the transparent indicator faces are transparent screens having meter dials formed thereon.
5. In a display apparatus for exhibiting information before an image receiving unit aligned along a first axes;
  (a) a first display aligned along said first axis spaced from and opposing said unit;
  (b) a projector aligned along a second axis perpendicular to and intersecting said first axis between the first display and the unit; and
  (c) a one-way mirror positioned at the intersection of the first and second axes for reflecting the projector image onto the first display and transmitting the first display image to the unit.
6. In a display apparatus as defined in claim 5 wherein the first display includes an opaque screen for receiving the projector image.
7. In a display apparatus as defined in claim 5:
  (d) a second display aligned along the second axis and spaced from and opposing the projector and wherein the one-way mirror reflects the image of the second display directly to the unit.
8. In a display apparatus as defined in claim 7:
  (e) a first shutter positioned between the mirror and the second display;
  (f) a second shutter positioned between the mirror and the projector; and
  (g) control means for alternately opening the first shutter and the second shutter.
9. A combination in accordance with claim 8 wherein the first display comprises:
  (a) a meter movement;
  (b) a plurality of transparent screens having meter faces mounted thereon;
  (c) an opaque screen;
  (d) conveying means for interposing the transparent and opaque screens in front of the meter movement;
  (e) a plurality of weather monitoring circuits corresponding to the meter faces; and
  (f) lighting means for illuminating the meter movement.
10. A combination in accordance with claim 9 wherein the second display comprises an electrical time device.
11. The combination in accordance with claim 10 wherein the control means selectively and sequentially:
  (a) connects the weather monitoring circuits one at a time to the meter movement and activates the conveying means to interpose the transparent screens having the meter faces corresponding to the selected monitoring circuits in front of the meter movement and activates the lighting means;
  (b) opens the projector shutter and activates the conveying means to interpose the opaque screen in front of the meter movement; and
  (c) opens the time device shutter.
12. The combination in accordance with claim 10 wherein the second display has a drive means for gyrating the time device about the second axis.

13. The combination in accordance with claim 9 wherein the conveying means comprises a turntable for supporting the transparent and opaque screens and for indexing the screens one at a time in front of the meter movement.

14. The combination in accordance with claim 10 wherein said projector includes forward and reverse stepping controls to control slide selection, further comprising:
 (a) first projector control means to advance said projector stepping controls to display a pre-selected number of slides onto said opaque screen;
 (b) second projector control means to reverse said projector stepping controls after display of the last slide in the projector series of slides.

References Cited

UNITED STATES PATENTS

| 1,503,488 | 8/1924 | Craver. | |
| 2,351,238 | 6/1944 | Teuber | 40—130 |
| 2,460,350 | 2/1949 | Hinman. | |
| 2,745,901 | 5/1956 | Owens. | |

FOREIGN PATENTS 858,704  1/1961  England.

NORTON ANSHER, Primary Examiner

R. P. GREINER, Assistant Examiner

U.S. Cl. X.R.

40—130; 353—94